C. H. PERRY.
SPRINKLER.
APPLICATION FILED JUNE 5, 1915.
1,178,344.
Patented Apr. 4, 1916.
2 SHEETS—SHEET 1.
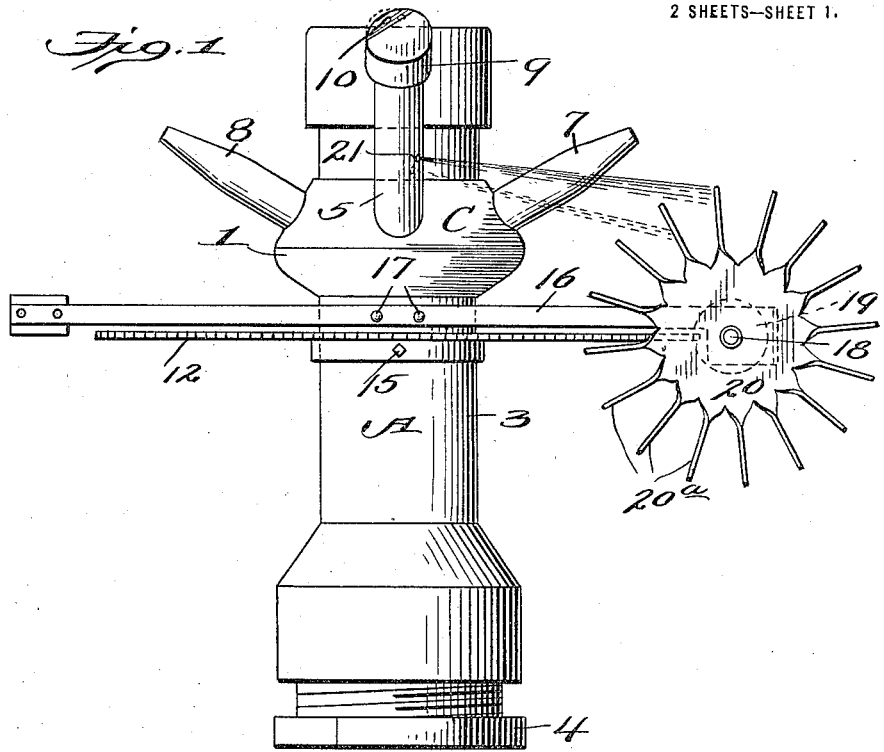
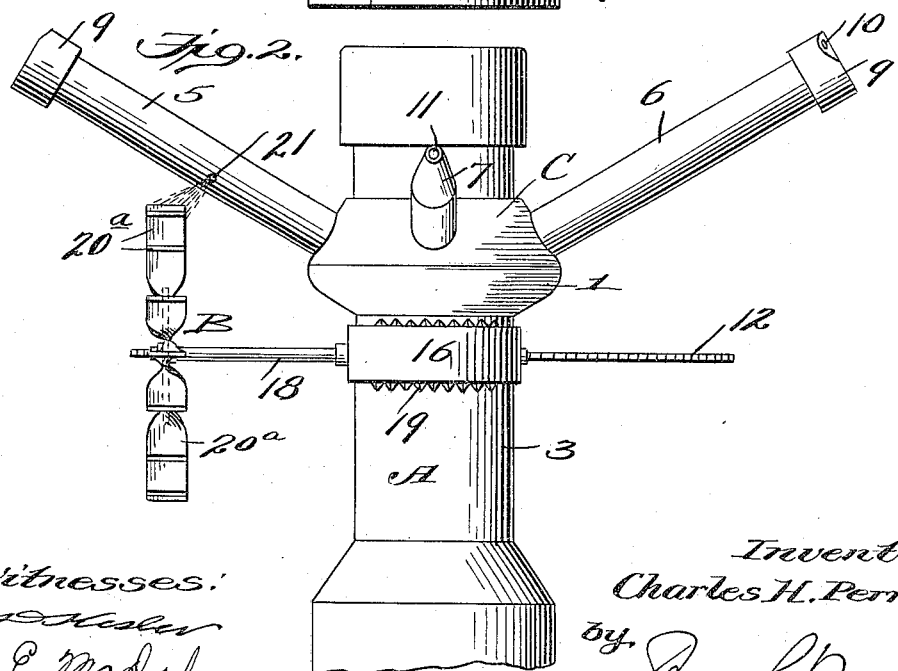
Witnesses:
Inventor
Charles H. Perry,
by James L. Norris
Attorney C. H. PERRY.
SPRINKLER.
APPLICATION FILED JUNE 5, 1915.
1,178,344.
Patented Apr. 4, 1916.
2 SHEETS—SHEET 2.
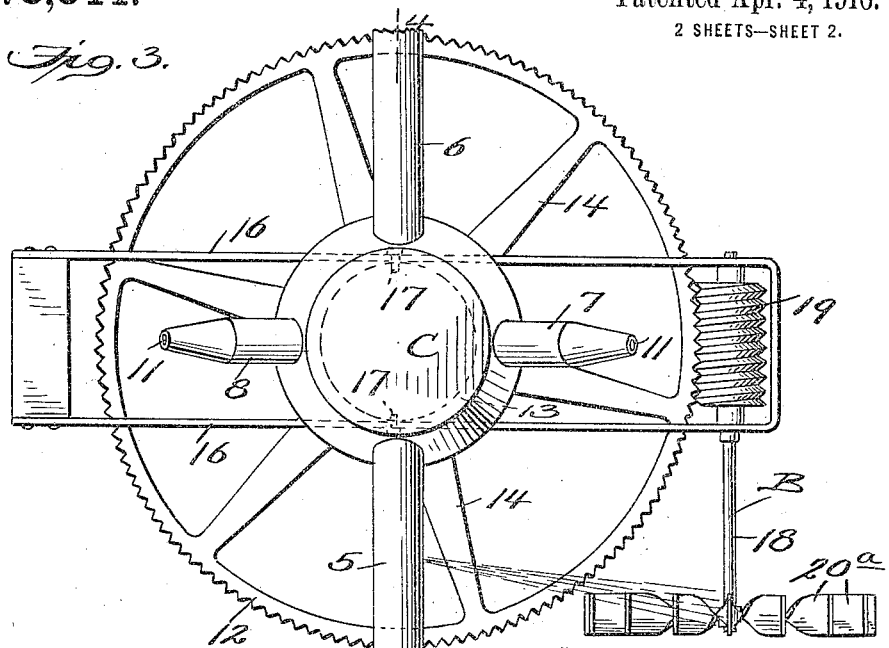
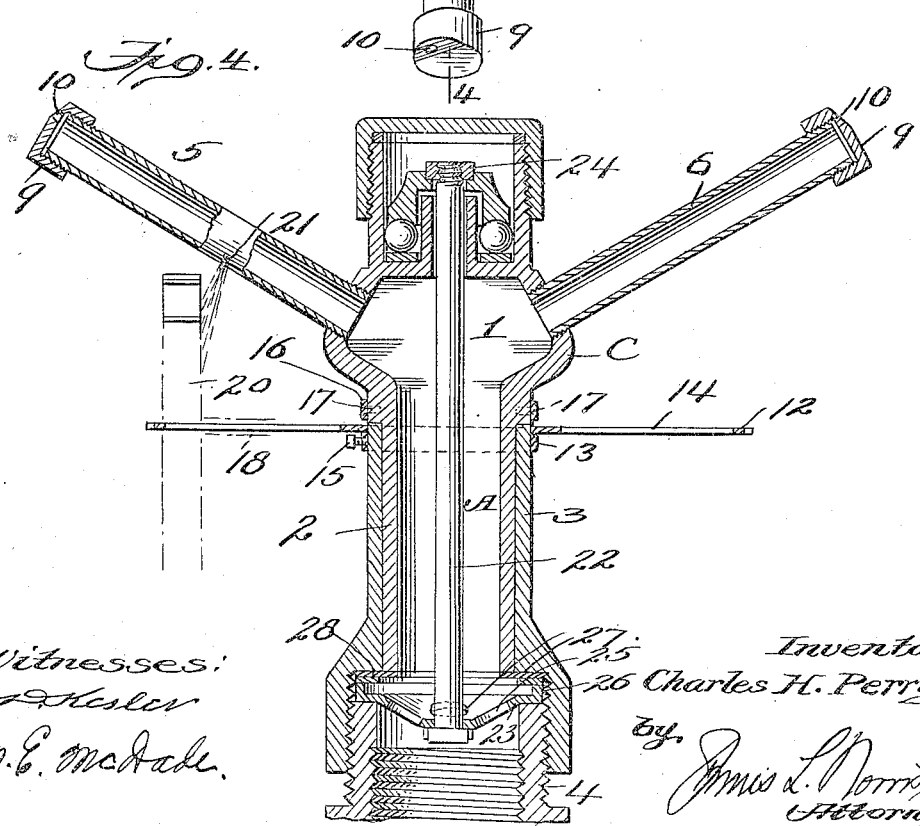
Witnesses:
Inventor
Charles H. Perry
by
James L. Norris
Attorney

UNITED STATES PATENT OFFICE.

CHARLES H. PERRY, OF MIAMI, FLORIDA.

SPRINKLER.

1,178,344.      Specification of Letters Patent.      Patented Apr. 4, 1916.

Application filed June 5, 1915. Serial No. 32,401.

*To all whom it may concern:*

Be it known that I, CHARLES H. PERRY, a citizen of the United States, residing at Miami, in the county of Dade, and State of Florida, have invented new and useful Improvements in Sprinklers, of which the following is a specification.

The present invention relates to irrigating sprinklers and has for its main object to produce a novel means for positively effecting the sprinkling operation of the device and which will insure a constant and even operation thereof.

Other objects of the invention are to provide means for varying the rotary speed of the sprinkler, at will, and to provide a spraying nozzle of novel construction.

A feature of the invention is to produce a water wheel having a driving connection with the sprinkler and adapted to be acted upon and propelled by a stream of water issuing from the sprinkler.

Another feature of the invention resides in the adjustable nozzles formed with a supplemental discharge opening adapted to successively direct a stream of water upon the water wheel, these nozzles being adjustable to vary the rotary speed of the wheel and sprinkler.

Other objects of the invention will appear as the specification proceeds, the invention consisting in the arrangement of parts and combination of elements hereinafter fully described and finally pointed out in the appended claims.

In the drawings forming part of the specification: Figure 1 is an elevation of the invention; Fig. 2 is a view at right angles to Fig. 1, looking in the direction of the arrow; Fig. 3 is a top plan view of the invention, as shown in Fig. 1; Fig. 4 is a view taken substantially on line 4—4 of Fig. 3, the water wheel being shown in dotted lines to illustrate the operation of the device.

Like reference characters denote similar like parts throughout the specification and drawings.

Referring particularly to the drawings, A denotes a sprinkler of the same general construction that is shown and described in my co-pending application Serial No. 877,723, consisting of the distributing chamber 1 having the tubular extension 2 adapted to be journaled in the stationary sleeve 3 which is attached to the end of a pipe or suitable water supply through the medium of the threaded nut 4. Radially extending from the distributing chamber 1 are the spraying nozzles indicated by the numerals 5, 6, 7 and 8, it being understood, however, that any desired number of spraying nozzles may be provided. The spraying nozzles, as shown, are of two different types, the nozzles 5 and 6 being of greater length than the nozzles 7 and 8, and having their ends provided with threaded caps 9, each formed with an angularly directed water discharge opening 10. The shorter nozzles 7 and 8 have their discharge openings 11 formed to discharge streams of longer radius than the streams discharged by the nozzles 5 and 6.

To provide for a constant and even speed of rotation of the spraying nozzles a direct driving means B is provided adapted to be removably secured to the device. This driving means may be adapted to sprinklers of various constructions and is not limited to use with the sprinkler here shown. The preferred construction of the said driving means includes a gear 12 concentric with and secured to the stationary sleeve 3. The gear preferably is of a wheel construction consisting of a hub or collar 13 having radially extending spokes 14 and a toothed rim carried by said spokes. A thumb nut 15 is threaded into the collar 13 and adapted to engage with the sleeve 3 for fixedly securing the gear to the latter. A carriage 16 of any suitable or preferred construction is rigidly secured to a portion of the chamber 1 and supports thereupon the driving mechanism B. The carriage driving mechanism preferably consists of a rectangular frame 16 adapted to embrace the chamber 1 and be secured thereto at the contacting points by means of a screw, as shown at 17. The ends of the rectangular frame or carriage 16 extend beyond the periphery of the gear 12. Mounted within the frame at one end thereof and upon the shaft 18 is a worm 19 so journaled or disposed in the end of the frame as to be in constant engagement with the teeth of the gear 12. The shaft 18 is journaled in opposite sides of the carrier frame 16 and has one end extended laterally therefrom and carrying upon its extremity a water or propelling wheel 20 provided with suitable fan blades or buckets 20ª. The water wheel 20 is adapted to lie in a vertical plane parallel with the frame and to one side of the gear 12, at substantially a tangent thereto. It will thus be seen that the carriage is adapted to revolve with the distributing chamber 1 and spraying nozzles and to carry therewith the worm 19 in a constant threading engagement with the teeth of the gear 12.

Formed in the side of the nozzle 5 is a supplemental discharge opening 21 adapted to direct a stream of water to play upon and against the blades 20ª of the water wheel, whereby the latter is rotated upon its axis and, also, rotates therewith the worm 19, which, in turn, threads upon the toothed surface of the stationary gear 12, thus effecting a positive drive for the rotatable sprinkler head C. Therefore, it will be seen from the drawings that when water is admitted through the distributing chamber 1, the same will issue through the discharge nozzles 5, 6, 7 and 8, and a stream of water will also issue from the supplemental discharge 21, which will play upon the blades of the wheel 20 and cause the rotation of the sprinkler head C. In view of the rigid connection of the carriage 16 with the head C, the wheel 20 will be carried or moved in advance of the nozzle 5 and be constantly acted upon by the stream of water discharged through the opening 21.

The above driving means insures a constant and unvarying rotation of the head C and permits the nozzles to properly spray or sprinkle all portions of the ground within the area of their radii. As shown in the drawings, the nozzles are secured to the chamber 1 by a threaded connection which permits the nozzle 5 to be adjusted in order to vary the angle of the stream issuing from the opening 21 and hence the force with which said stream acts on the wheel 20. In this way the speed of rotation of the spraying head may be regulated as described. It will be obvious that when the nozzle is turned to direct the stream of water issuing from the discharge 21 upon the outer ends of the blades of the wheel 20, the latter and therewith the sprinkler head will be rotated at maximum speed. When, however, the nozzle 5 is adjusted to carry the stream closer to the center of the wheel, the speed of rotation of the latter is reduced. It will be thus apparent that a very fine adjustment of the nozzle 5 may be had for varying the speed at which the wheel 20 may be driven and the sprinkler head rotated.

As may be further seen from the drawings, the driving means consisting of the stationary gear 12, the carrier frame 16, the worm 19 and the water wheel 20, may be detached or removed from the sprinkler and applied to various other sprinklers of the same general construction.

The caps 9 provided with the discharge openings 10 are in threaded engagement with the nozzles 5 and 6 and may be adjusted thereupon to vary the direction of flow of the water issuing from the said nozzles, in view of the angular formation of said discharge opening. The caps 9 may be adjusted for increasing or reducing the radial spraying capacity of the nozzles 5 and 6 or may be so adjusted as to cause the stream of water to flow therefrom tangentially to the plane of rotation of the spraying head and thus cause the latter to rotate when the driving means B are removed from the sprayer.

In this embodiment, the stay bolt 22, which is provided for holding the head C and the sleeve 3 in operative relation, has its lower end extending through the inverted cone-shaped metallic washer 23. The extremity of the bolt 22 has threaded thereon the nut 24. The washer 23 is provided with a plurality of perforations 25 and has its peripheral edge formed with the flange 26 adapted to extend between the connecting nut 4 and the shoulder 27 of the sleeve 3. An annular rubber washer 28 is interposed between the shoulder 27 and the washer 23 and has its inner diameter less than the diameter of the passage through the tubular extension 2. The peculiar construction provided by the washers 23 and 28 permits a better flow through the sprinkler head and prevents waste of water without the provision of a stuffing box. The washer 28 also acts as an automatic valve for keeping the sand and foreign matter, carried in the water, from the operating parts of the sprinkler head and insures a water-tight joint between the tubular extension 2 and the stationary sleeve 3.

It is to be understood that certain changes as to the exact and precise construction of the invention may be resorted to that fall within the scope of the appended claims.

What is claimed is:—

1. Means for operating rotatable irrigating sprinklers, comprising a gear adapted to surround the sprinkler and to be fixedly and removably connected to a stationary portion thereof, a carriage adapted to be removably secured to the rotatable portion of said sprinkler, a shaft journaled in said carriage, a worm on said shaft and in constant mesh with said gear, and a water wheel mounted on said shaft and disposed at one side of said carriage to be acted upon by a stream of water issuing from the sprinkler, whereby the rotatable portion of the sprinkler is rotated.

2. A detachable rotating means for irrigating sprinklers having a rotatable nozzle, comprising a gear adapted to surround the sprinkler and to be fixedly and removably secured to a stationary portion of the sprinkler, a horizontally extending carriage removably secured to a rotatable portion of the sprinkler, a worm journaled in said carriage and adapted to constantly mesh with said gear, and a vertical water wheel supported on the axis of said worm, said nozzle having an auxiliary discharge opening therein adapted to direct a stream of water upon said wheel whereby the worm is driven and the rotatable portion of the sprinkler is rotated.

3. In combination, an irrigating sprinkler having a rotatable nozzle with an auxiliary discharge opening therein, a detachable rotating means for said sprinkler comprising a gear adapted to surround the sprinkler and to be fixedly and removably secured to a stationary portion thereof, a horizontally extending carriage removably secured to a rotatable portion of the sprinkler, a shaft journaled in said carriage, a worm on said shaft and in constant mesh with said gear, and a water wheel mounted on said shaft and disposed at one side of the carriage to be acted upon by a stream of water issuing from said auxiliary opening, said nozzle being adjustable to vary the position of said auxiliary opening for varying the speed of rotation of the sprinkler.

In testimony whereof I have hereunto set my hand in presence of two subscribing witnesses.

CHARLES H. PERRY.

Witnesses:
FRED W. CASON,
LAURA S. HUCK.

Copies of this patent may be obtained for five cents each, by addressing the "Commissioner of Patents, Washington, D. C."